(12) United States Patent
    Cagli

(10) Patent No.: US 12,131,131 B2
(45) Date of Patent: Oct. 29, 2024

(54) RANDOM NUMBER GENERATOR CIRCUIT

(71) Applicant: COMMISSARIAT À L'ENERGIE ATOMIQUE ET AUX ENERGIES ALTERNATIVES, Paris (FR)

(72) Inventor: Carlo Cagli, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 657 days.

(21) Appl. No.: 17/317,349

(22) Filed: May 11, 2021

(65) Prior Publication Data

US 2021/0357185 A1    Nov. 18, 2021

(30) Foreign Application Priority Data

May 12, 2020  (FR) ...................................... 2004645

(51) Int. Cl.
    *G06F 7/58*     (2006.01)
    *H03K 3/84*     (2006.01)

(52) U.S. Cl.
    CPC ............... *G06F 7/588* (2013.01); *H03K 3/84* (2013.01)

(58) Field of Classification Search
    CPC .... G11C 13/0007; H03K 3/84; H03K 3/0377; G06F 7/58–588
    See application file for complete search history.

(56) References Cited

U.S. PATENT DOCUMENTS

| | | | | | |
|---|---|---|---|---|---|
| 2,412,227 | A | * | 12/1946 | Och ....................... | G06G 7/186 333/19 |
| 6,064,236 | A | * | 5/2000 | Kuwata ................ | H03D 13/003 327/27 |
| 8,378,864 | B2 | * | 2/2013 | Zhao ........................ | H03M 1/06 341/172 |
| 9,304,741 | B2 | * | 4/2016 | Massetti ................ | G01R 29/26 |
| 11,856,798 | B2 | * | 12/2023 | Cohen .................. | H10N 70/021 |
| 2017/0372783 | A1 | * | 12/2017 | Shifren .............. | G11C 13/0004 |
| 2019/0187957 | A1 | * | 6/2019 | Avital ....................... | H03K 3/84 |
| 2019/0303104 | A1 | | 10/2019 | Yang et al. | |

(Continued)

FOREIGN PATENT DOCUMENTS

| EP | EP 2 786 989 A2 | 10/2014 | |
|---|---|---|---|
| GB | 2571546 A * | 9/2019 | ............. G06F 7/588 |

OTHER PUBLICATIONS

Hur, JH., Kim, Dk. A study on mechanism of resistance distribution characteristics of oxide-based resistive memory. Sci Rep 9, 302 (2019). https://doi.org/10.1038/s41598-018-35838-x, abstract (Year: 2019).*

(Continued)

*Primary Examiner* — Matthew D Sandifer
(74) *Attorney, Agent, or Firm* — Pillsbury Winthrop Shaw Pittman LLP

(57) ABSTRACT

A random number generator circuit includes a noise source capable of providing a noise signal that varies randomly; and a circuit for extracting the noise signal including an edge detector configured to produce from the noise signal an analogue signal including voltage pulses, each voltage pulse corresponding to a rising or falling edge of the noise signal, and an analogue-to-digital converter configured to generate a random bit sequence from the analogue signal.

8 Claims, 3 Drawing Sheets

(56) References Cited

U.S. PATENT DOCUMENTS

2020/0241842 A1\* 7/2020 Cheng .................... G11C 7/24
2022/0197599 A1\* 6/2022 Cambou ................ G06F 7/588

OTHER PUBLICATIONS

Bersuker, G., Gilmer, D.C. Metal Oxide Resistive Random Access Memory (RRAM) Technology. p. 289 (Year: 2014).\*
Butterfield, A., Szymanski, J. A Dictionary of Electronics and Electrical Engineering (5 ed.), Oxford, (Year: 2014), references for Edge detection, Differentiator, and Comparator.\*
Search Report as issued in French Patent Application No. 2004645, dated Jan. 22, 2021.
Petrie, C. S., et al., "A Noise-Based IC Random Number Generator for Applications in Cryptography," IEEE Transactions on Circuits and Systems-I: Fundamental Theory and Applications, vol. 47, No. 5, May 2000, pp. 615-621.
Yang, J., et al., "A Low Cost and High Reliability True Random Number Generator Based on Resistive Random Access Memory," IEEE, (2015), 4 pages.
Sahay, S., et al., "Hybrid CMOS-OxRAM RNG Circuits," Proceedings of the 16th International Conference on Nanotechnology, Aug. 2016, pp. 393-396.
Zhun, H., et al., "A Truly Random Number Generator Based on Thermal Noise," IEEE, (2001), pp. 862-864.
Huang, C.-Y., et al., "A Contact-Resistive True Random Number Generator," IEEE Electron Device Letters, vol. 33, No. 8, Aug. 2012, pp. 1108-1110.

\* cited by examiner

RANDOM NUMBER GENERATOR CIRCUIT

CROSS-REFERENCE TO RELATED APPLICATIONS

This application claims priority to French Patent Application No. 2004645, filed May 12, 2020, the entire content of which is incorporated herein by reference in its entirety.

TECHNICAL FIELD OF THE INVENTION

The present invention relates to a random number generator circuit. Random numbers are used in many applications, such as computer games, cryptography, systems security and digital simulation.

TECHNOLOGICAL BACKGROUND OF INVENTION

Random number generators (RNGs) play an essential role in the encryption of data and in securing communications. They produce a sequence of random bits that can be used as a cryptographic key. These devices can be carried out in different ways and are generally ranked into two categories: truly random number generators (or TRNG for "True RNG") and pseudo-random number generators (or PRNG for "Pseudo-RNG").

PRNGs are based on deterministic algorithms to generate numbers which appear to be random. TRNGs are electronic circuits that produce the randomness from a physical entropy source, by transformation of analogue signals into digital signals. The physical entropy source is generally a noise source, for example the thermal noise of a semiconductor device.

FIG. 1 diagrammatically shows a truly random number generator circuit (TRNG) 10 described in documents ["A low cost and high reliability true random number generator based on resistive random access memory", Jianguo YANG et al., IEEE 11th International Conference on ASIC (ASICON), 2015] and ["A contact-resistive random-access-memory-based true random number generator", Chien-Yuan HUANG et al., IEEE electron device letters, Vol. 33, No. 8, pp 1108-1110, 2012].

This TRNG circuit 10 makes use of the random telegraph noise (RTN), produced by a resistive random access memory 11 (RRAM). This noise results from the trapping and detrapping of electrons in the vicinity of the conductive path that is formed between the electrodes of the memory cell 11.

In addition to the memory cell 11, the TRNG circuit 10 comprises a selection transistor 12 to connect the memory cell 11 to a polarisation circuit (not shown), a comparator 13 and a D flip-flop 14 clocked by a clock signal CLK. The positive input of the comparator 13 is connected to an electrode of the memory cell 11 and to the drain of the selection transistor 12, while the negative input of the comparator 13 is connected to a reference voltage $V_{REF}$. The output of the comparator 13 is connected to the input D of the D flip-flop 14. The comparator 13 carries out the digitisation of the output voltage $V_D$ of the memory cell 11. If the output voltage $V_D$ is greater than the reference voltage $V_{REF}$, then the signal at the output of the comparator 13 takes the binary value '1'. Otherwise, the signal at the output of the comparator 13 takes the binary value '0'. The D flip-flop 14 samples the signal at the output of the comparator 13 at each rising edge of the clock signal CLK. Between two consecutive rising edges of the clock signal CLK, the D flip-flop 14 retains in memory the sampled value of the signal.

This circuit TRNG is compact and inexpensive to manufacture. However, it is difficult to digitise a noise signal with a simple comparator and a D flip-flop, because it is not possible to foresee the variation range of the noise signal or the average value thereof. The reference voltage $V_{REF}$, predefined, risks not being located in this variation range, making the TRNG circuit inoperative.

SUMMARY OF THE INVENTION

There is therefore a need to provide a random number generator circuit that is more reliable and simpler to configure.

According to the invention, this need tends to be satisfied by providing a random number generator circuit comprising:
- a noise source capable of providing a noise signal that varies randomly;
- a circuit for detecting the noise signal comprising:
  - an edge detector configured to produce voltage pulses, each voltage pulse corresponding to a rising or falling edge of the noise signal;
  - an analogue-to-digital converter configured to generate a random bit sequence from voltage pulses.

The analogue signal delivered by the edge detector and comprising the voltage pulses is easier to digitise than the noise signal provided by the noise source, because the variation range of the analogue signal is known and does not vary, contrary to that of the noise signal. Indeed, the amplitude of the voltage pulses is limited by the supply voltage of the edge detector. The digitisation of the analogue signal can thus be carried out by comparing it to a non-zero reference value less than the supply voltage of the edge detector. Setting the reference value is therefore not a complex task in the random number generator circuit according to the invention and the latter does not risk becoming inoperative due to a deviation of the noise source.

In addition to the characteristics that have just been mentioned hereinabove, the random number generator circuit according to the invention can have one or more additional characteristics among the following, taken individually or in all technically permissible combinations:
- the edge detector comprises a differentiator;
- each voltage pulse has an amplitude that is a function of the derivative of the noise signal;
- the random number generator circuit further comprises a rectifier circuit disposed between the edge detector and the analogue-to-digital converter;
- the random number generator circuit further comprises a voltage limiter circuit disposed between the edge detector and the analogue-to-digital converter;
- the analogue-to-digital converter comprises a D flip-flop clocked by a clock, the D flip-flop comprising an input connected to the edge detector;
- the analogue-to-digital converter comprises a comparator, the comparator having a first input connected to the edge detector and a second input connected to a reference voltage;
- the noise source is a random telegraph noise source;
- the noise source comprises a resistive memory cell of the filament type, such as an oxide-based resistive memory cell (OxRAM);
- the resistive memory cell is in a highly resistive state and has an electrical resistance greater than or equal to 30 kΩ; and the voltage source is coupled to the detection circuit via a switch.

The invention and its various applications will be understood better when reading the following description and examining the accompanying figures.

BRIEF DESCRIPTION OF THE FIGURES

Other characteristics and advantages of the invention shall appear clearly in the description that is given of it hereinbelow, for the purposes of information and in no way limiting, in reference to the accompanying figures, among which.

For increased clarity, identical or similar elements are marked with identical reference sings in all the figures.

DETAILED DESCRIPTION

Figure 1:
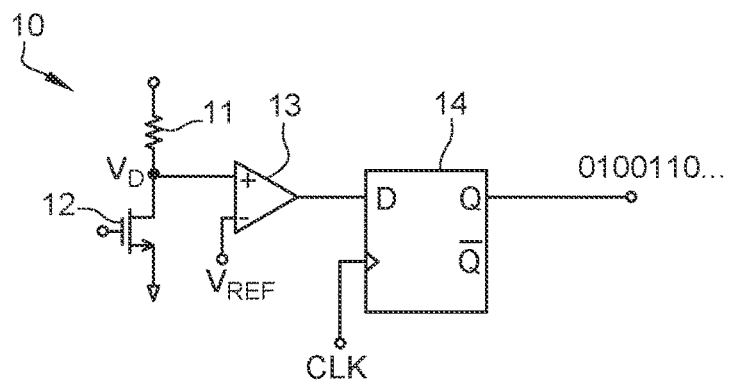
FIG. 1, described hereinabove, diagrammatically shows a random number generator circuit according to the prior art.
Figure 2:
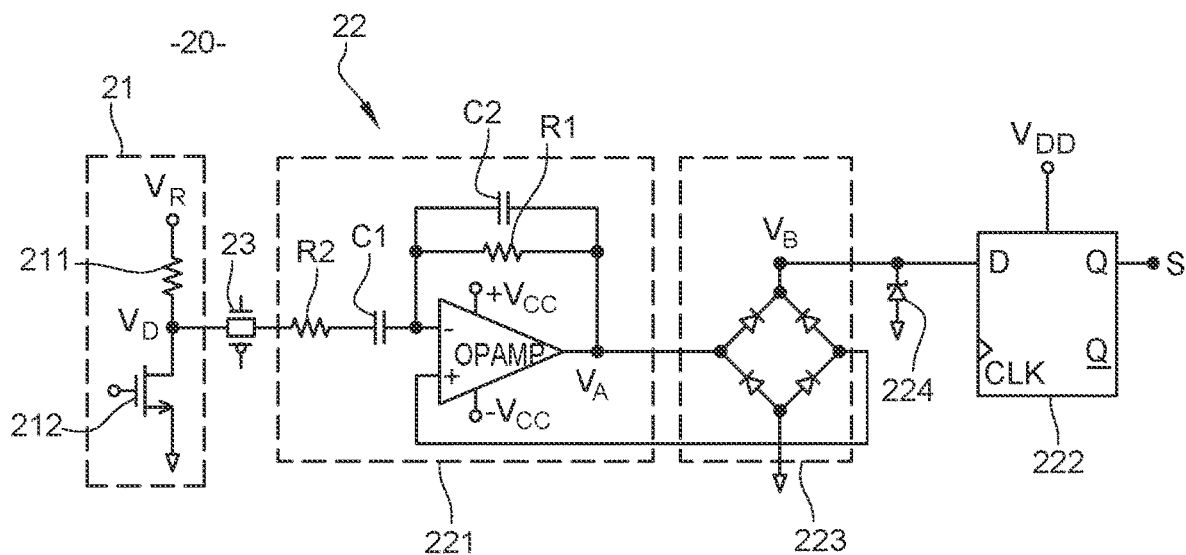
FIG. 2 diagrammatically shows a random number generator circuit according to a first embodiment of the invention.

FIG. 2 shows the electrical diagram of a random number generator circuit (RNG) 20 according to a first embodiment of the invention.

The RNG circuit 20 comprises a noise source 21, capable of providing a noise signal $V_D$ that varies randomly, and a circuit for extracting 22 the noise signal $V_D$. The extraction circuit 22 is configured to convert the noise signal $V_D$ into a sequence of random bits S, also called random bit stream.

The noise source 21 is preferably a random telegraph noise source (RTN). RTN contaminated signals are easier to use than the other noise signals, in particular thermal noise signals, because they have higher amplitude variations and lower frequency variations. Moreover, a source of RTN is easier to model (because the RTN source can be characterised independently of the extraction circuit) and is less sensitive to variations in temperature than a thermal noise source. Using a source of RTN rather than a thermal noise source therefore makes the RNG circuit more resistant to attacks based on variations in temperature. A source of RTN also facilitates the qualification of the RNG circuit for security applications.

In the embodiment shown in FIG. 2, the noise source 21 comprises a resistive memory cell 211 of the filament type and its polarisation circuit.

The resistive memory cell 211 comprises a first electrode, electrically connected to the extraction circuit 22, a second electrode, opposite the first electrode and connected to a polarisation voltage, for example a reading voltage $V_R$, and a layer of resistant material disposed between the first and second electrodes. The resistive memory cell 211 is for example an oxide-based resistive memory cell (OxRAM). The first and second electrodes are then separated by a layer of oxide, for example hafnium oxide ($HfO_2$).

The noise signal $V_D$ from which the sequence of random bits S is generated is preferably a read signal of the resistive memory cell 211. The resistive memory cell 211 generates RTN when it is in the highly resistive state (HRS) or in the low resistive state (LRS). However, the amplitude of the variations in the noise signal $V_D$ is more substantial when the memory cell is in the highly resistive state. In order to obtain a noise signal $V_D$ that can be used more easily, the resistive memory cell 211 is advantageously programmed in the highly resistive state. The resistance of the resistive memory cell 211 is more preferably greater than or equal to 30 kn.

The polarisation circuit of the resistive memory cell 211 preferably comprises a selection transistor 212. This selection transistor 212 makes it possible to turn on the resistive memory cell 211. It is sized to allow for the passage of a current that is sufficiently high to program the resistive memory cell 211 in the low resistive state or (preferably) in the highly resistive state. The selection transistor 212 is for example a MOS transistor of which the drain electrode is connected to the first electrode of the memory cell 211. The connection between the drain electrode of the selection transistor 212 and the first electrode of the memory cell 211 forms the output of the noise source 21.

The MOS transistor allows for the reading of the resistive memory cell 211 at a low reading voltage $V_R$. According to the voltage value applied at its gate, the MOS transistor forms with the resistive memory cell 211 a voltage divider bridge in order to extract the noise signal $V_D$. The gate voltage of the MOS transistor is advantageously chosen so that the selection transistor 212 has an electrical resistance of the same order as that of the resistive memory cell 211, for example between 10 k$\Omega$ and 100 k$\Omega$.

The noise source 21 can be coupled to the extraction circuit 22 via a switch 23, also called a pass-gate. In other words, the switch 23 is connected between the output of the noise source 21 and the input of the extraction circuit 22. The switch 23 makes it possible to isolate the noise source 21 from the extraction circuit 22, in particular during the programming of the resistive memory cell 211.

The extraction circuit 22 comprises a rising and/or falling edge detector 221 and an analogue-to-digital converter 222. The edge detector 221 is configured to produce, from the noise signal $V_D$, an analogue signal comprising positive voltage pulses and/or negative voltage pulses. Each voltage pulse corresponds to a rising or falling edge (or transition) of the noise signal $V_D$. Most voltage pulses have an amplitude less than or equal to the supply voltage $V_{CC}$ of the edge detector 221 (it is not excluded that the amplitude of a few pulses can exceed the supply voltage $V_{CC}$ of the edge detector 221). The analogue-to-digital converter 222 is configured to then transform the analogue signal (possibly post-processed in the way described hereinafter) into a sequence of random bits.

The edge detector 221 preferably comprises a differentiator. The voltage pulses produced by the edge detector 221 then have an amplitude which is a function of the derivative of the noise signal $V_D$, or the speed at which the noise signal $V_D$ varies. The differentiator more preferably comprises an operational amplifier (OP AMP), a first capacitor C1 disposed on an input connection of the operational amplifier, downstream of the noise source 21, and a first resistor R1 disposed in a feedback loop of the operational amplifier. A second capacitor C2 can be connected in parallel of the first resistor R1 in order to prevent the output signal from the differentiator from oscillating. Moreover, a second resistor R2 can be connected in series with the first capacitor C1 in order to limit the gain of the amplifier with respect to the values of resistors R1/R2.

The extraction circuit can also include a rectifier circuit 223 and/or a voltage limiter circuit 224 disposed between the edge detector 221 and the analogue-to-digital converter 222.

The input of the rectifier circuit 223 is connected (more preferably directly) to the output of the edge detector 221. It converts the negative voltage pulses produced by the edge detector 221 into positive voltage pulses. The rectifier circuit 223 is particularly advantageous because it substantially increases the flow rate of bits generated by the RNG circuit 20, by doubling (approximately) the number of positive voltage pulses at the input of the analogue-to-digital converter 222. The rectifier circuit 223 comprises for example a diode bridge, such as shown in FIG. 2.

The voltage limiter circuit 224 is more preferably disposed between the rectifier circuit 223 and the analogue-to-digital converter 222. It limits the amplitude of the positive voltage pulses to a voltage limit value, for example comprised between 0 V and the supply voltage $V_{DD}$ of the analogue-to-digital converter 222. It comprises for example an inverse-mounted Zener diode. The voltage limit value is then equal to the Zener voltage (or avalanche voltage) of the Zener diode.

In this first embodiment, the analogue-to-digital converter 222 comprises a D flip-flop clocked by a clock signal CLK. The input (D) of the D flip-flop receives the analogue signal, such as delivered as output by the edge detector 221 or advantageously rectified by the rectifier circuit 223 and/or limited in voltage by the voltage limiter circuit 224. When at the rising edge of the clock signal CLK the amplitude of the positive voltage pulses is greater than or equal to a reference voltage (referred to as triggering of the flip-flop), for example half the supply voltage $V_{DD}$ of the D flip-flop, the D flip-flop generates a bit with value '1'. When on the contrary the amplitude of the positive voltage pulses is strictly less than the reference voltage at the rising edge of the clock signal CLK, the D flip-flop generates a bit with value '0'. The D flip-flop thus carries out a digitalisation of the analogue signal.

FIGS. 3A to 3D are graphs showing different signals of the RNG circuit of FIG. 2 as a function of time.

Figure 3A:
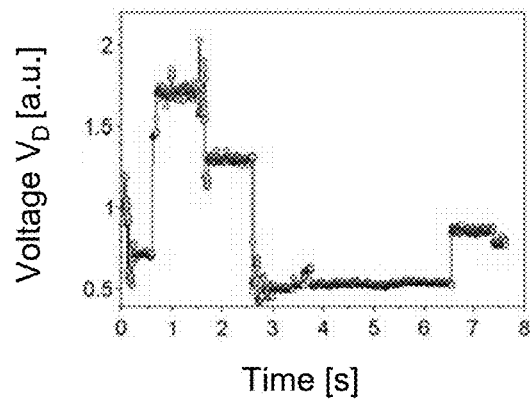
FIG. 3A, FIG. 3B, FIG. 3C and FIG. 3D show signals at different points of the random number generator circuit of FIG. 2.

FIG. 3A shows an example of a voltage signal $V_D$ produced by the noise source 21. This signal was obtained by reading the resistive memory cell 211. To do this, a reading voltage $V_R$ is applied on the second electrode of the resistive memory cell 211, while the selection transistor 212 is rendered ON. The reading voltage $V_R$ is for example comprised between 0.2 V and 0.5 V (according to the type of resistive memory cell 211).

The read signal of the memory cell is contaminated with RTN. This type of noise can be recognised by the various steps that it forms, these steps being separated by abrupt transitions (in other words its telegraphic form).

Figure 3B:
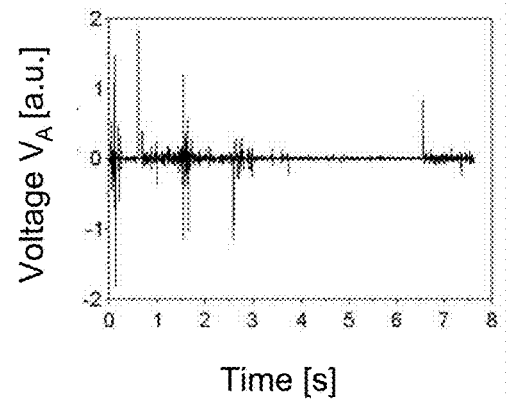

FIG. 3B shows the analogue voltage signal $V_A$ obtained as output from the edge detector 221. This analogue signal $V_A$ corresponds to the derivative of the read signal of FIG. 3A. It comprises positive voltage pulses and negative voltage pulses. Each positive voltage pulse corresponds to a rising transition of the read signal and each negative voltage pulse corresponds to a falling transition of the read signal.

Figure 3C:
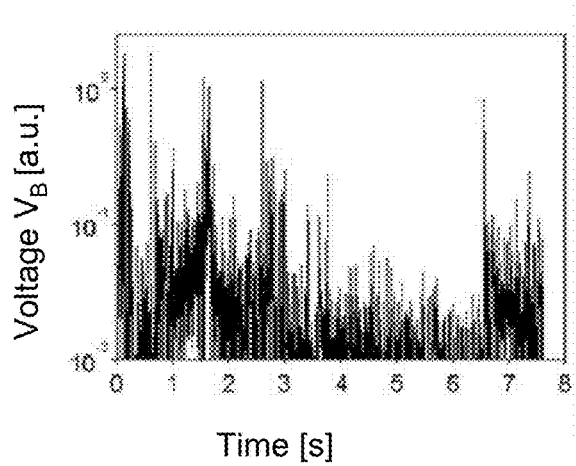

FIG. 3C shows (with a logarithmic voltage scale, not linear) the analogue signal VB rectified by the rectifier circuit 223. The latter now contains only positive voltage pulses.

Figure 3D:
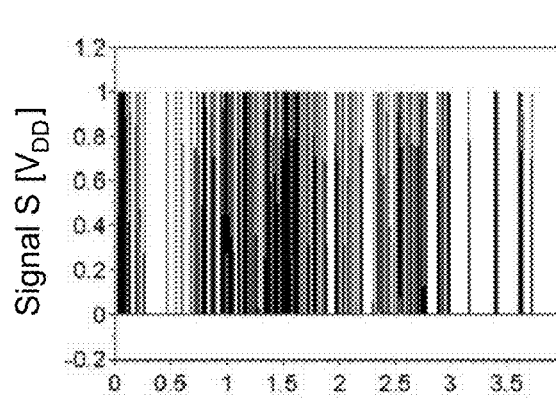

Finally, FIG. 3D shows the random bit sequence S delivered by the analogue-to-digital converter 222. The latter is comprised of a succession of bits with value '1' or '0'. Each bit with value '1' corresponds to a positive voltage pulse (of the modified analogue signal) having an amplitude greater than or equal to the reference voltage of the D flip-flop. Each bit with value '0' corresponds to a positive voltage pulse having an amplitude that is strictly less than the reference voltage of the D flip-flop or to an absence of a pulse at the rising edge of the clock signal CLK.

Figure 4:
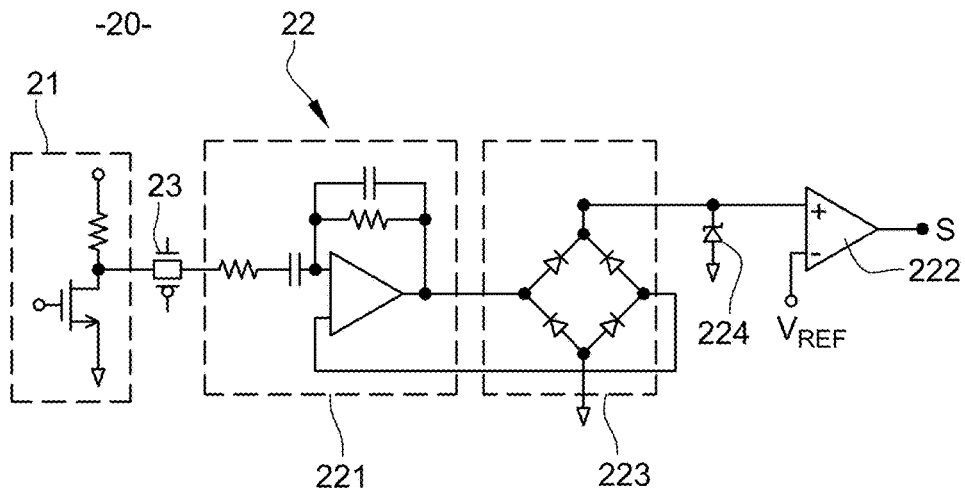
FIG. 4 diagrammatically shows a random number generator circuit according to a second embodiment of the invention.

FIG. 4 shows the electrical diagram of an RNG circuit 20 according to a second embodiment of the invention.

In this second embodiment, the analogue-to-digital converter 222 comprises a comparator (i.e. a level detector) instead of the D flip-flop. The comparator has a first input (positive) connected to the output of the edge detector 221, preferably via the rectifier circuit 223 and/or the voltage limiter circuit 224, and a second input (negative) connected to a reference voltage $V_{REF}$. The reference voltage $V_{REF}$ can be set to a very low value, for example comprised between 0.1 V and 0.5 V, given that all the positive voltage pulses start at 0 V. Each positive voltage pulse having an amplitude greater than or equal to the reference voltage $V_{REF}$ generates at the output of the comparator a bit with value '1'. Each positive voltage pulse having an amplitude strictly less than the reference voltage $V_{REF}$ generates at the output of the comparator a bit with value '0'.

Thus, with respect to the first embodiment, a larger number of voltage pulses are detected and the flow rate of the sequence of bits is more substantial.

The edge detector 221 of the RNG circuit 20 facilitates the digitisation of the noise signal, because the voltage pulses that it produces have a known variation range. The latter extends from 0 V to about the supply voltage $V_{CC}$ of the edge detector 221. There is therefore no longer any difficulty in setting the reference voltage so as to convert the analogue signal into a sequence of random bits. The risk of the RNG circuit 20 failing due to a deviation in the noise source 21 is consequently zero.

Thanks to this edge detector 221, an analogue-to-digital converter as simple as a D flip-flop or a comparator can be used, which has for effect to limit the silicon surface occupied by the RNG circuit and the cost of manufacturing thereof.

Figure 5:
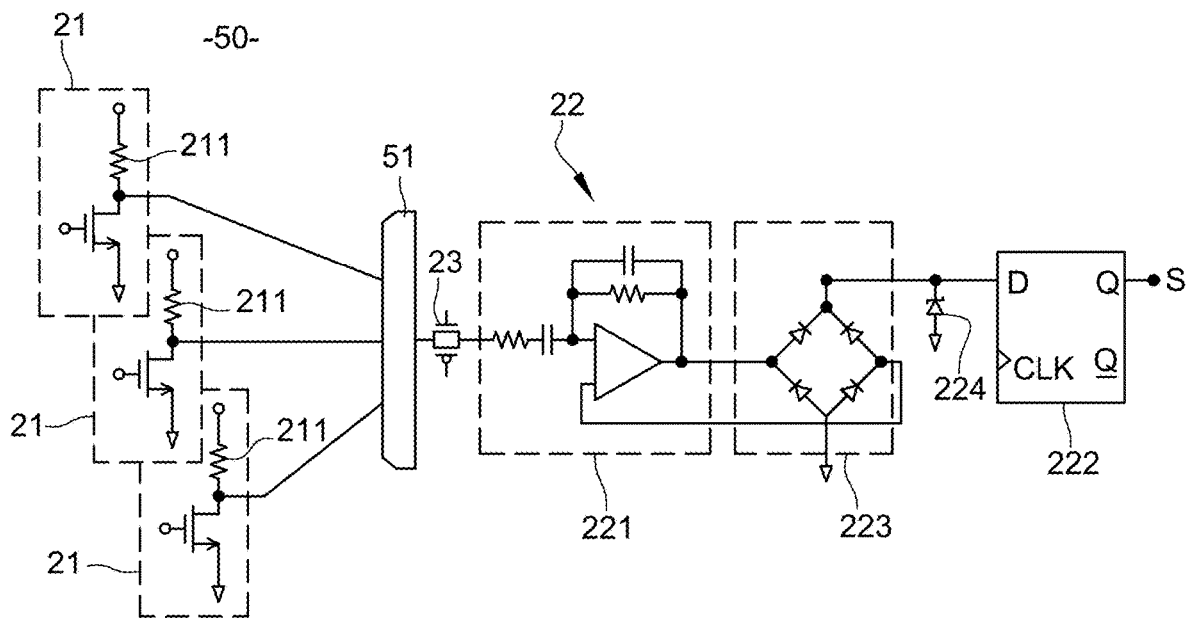
FIG. 5 diagrammatically shows a random number generator circuit according to a third embodiment of the invention.

FIG. 5 diagrammatically shows an RNG circuit 50 according to a third embodiment of the invention. The RNG circuit 50 comprises several noise sources 21, preferably identical, so as to increase the flow rate of the random bit sequence S generated by the circuit. The various noise sources 21 can be coupled to the same extraction circuit 22 (for example identical to the one of FIG. 2 or to the one of FIG. 4) via a multiplexer 51. By means of an addressing circuit, the multiplexer 51 successively connects the noise sources 21 to the extraction circuit 22, in order to sample and digitise the noise signal of each noise source 21. The scanning frequency of the multiplexer 51 is greater than the frequency of the variations of each noise signal.

In an alternative embodiment not shown in the figures, each noise source 21 is coupled to its own extraction circuit 22. In other words, the RNG circuit comprises as many extraction circuits 22 as noise sources 21. The outputs of the various extraction circuits 22 are connected to a multiplexer, that "aggregates" the various sequences of random bits at a low flow rate into a single sequence of random bits at a higher flow rate.

In the case of noise sources 21 each comprising a resistive memory cell 211, the various resistive memory cells 211 of the RNG circuit can belong to the same resistive memory cell array. Some memory cells of the array are thus dedicated to generating random numbers, while the other memory cells of the array are dedicated to storing information.

The random number generator circuit according to the invention is not limited to the embodiments described in reference to FIGS. 2 to 5 and many alternatives and modifications shall appear to those skilled in the art. In particular, other types of noise other than RTN can be used to generate (truly) random numbers. Mention can be made for example of thermal noise, due to the random movements of the charge carriers in the semiconductor materials, the noise due to the movements of the atoms that form the conductive filament of a resistive memory cell . . . . The noise source 21 is therefore not necessarily an RTN source.

In the same way, the noise source 21 does not necessarily comprise an OxRAM cell. It can in particular comprise another type of filament resistive memory cell, for example a conductive bridge random access memory cell (CBRAM), that also produces RTN. Alternatively, the noise source 21 can comprise an MOS transistor (source of RTN or of thermal noise) or a resistance (thermal noise source).

The analogue-to-digital converter 222 can comprise a Schmitt flip-flop instead of a D flip-flop or a comparator. The Schmitt flip-flop behaves as a D flip-flop but has the advantage of having a trigger voltage that can be configured between 0 V and its supply voltage (Vdd).

The invention claimed is:

1. A random number generator circuit comprising:
   a noise source adapted to provide a noise signal that varies randomly, wherein the noise source comprises a resistive memory cell of the filament type, wherein the resistive memory cell is in a highly resistive state and has an electrical resistance greater than or equal to 30 kΩ;
   a circuit for extracting the noise signal comprising:
      an edge detector comprising a differentiator and configured to produce from the noise signal an analogue signal comprising voltage pulses, each voltage pulse corresponding to a rising or falling edge of the noise signal and having an amplitude that is a function of the derivative of the noise signal;
      an analogue-to-digital converter configured to generate a random bit sequence from the analogue signal.

2. The random number generator circuit according to claim 1, further comprising a rectifier circuit disposed between the edge detector and the analogue-to-digital converter.

3. The random number generator circuit according to claim 1, further comprising a voltage limiter circuit disposed between the edge detector and the analogue-to-digital converter.

4. The random number generator circuit according to claim 1, wherein the analogue-to-digital converter comprises a D flip-flop clocked by a clock, the D flip-flop comprising an input connected to the edge detector.

5. The random number generator circuit according to claim 1, wherein the analogue-to-digital converter comprises a comparator, the comparator having a first input connected to the edge detector and a second input connected to a reference voltage.

6. The random number generator circuit according to claim 1, wherein the noise source is a random telegraph noise source.

7. The random number generator circuit according to claim 1, wherein the noise source is coupled to the circuit for extracting the noise signal via a switch.

8. The random number generator circuit according to claim 1, wherein the resistive memory cell is an oxide-based resistive memory cell (OxRAM).

* * * * *